No. 856,963. PATENTED JUNE 11, 1907.
C. LATSCH.
SOUP STRAINING APPARATUS.
APPLICATION FILED OCT. 17, 1906.
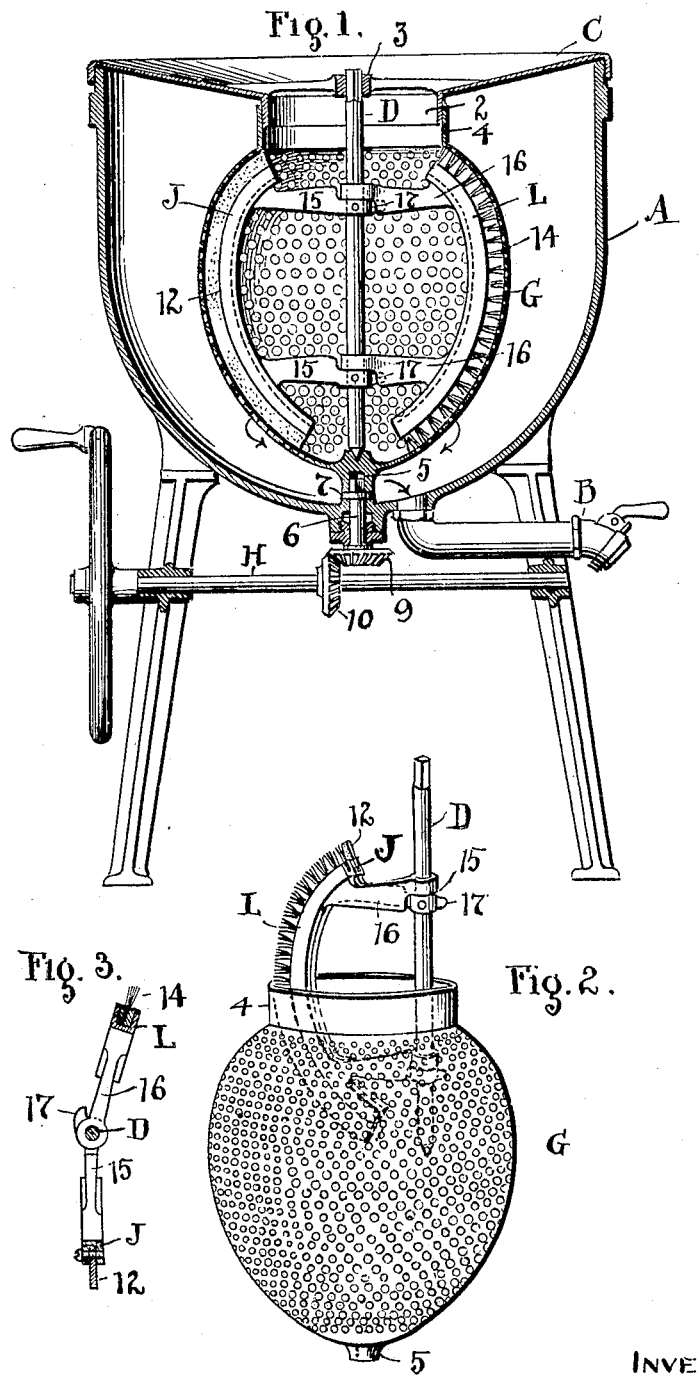
ATTEST
E. M. Fisher
R. C. Ketcham
INVENTOR
Charles Latsch
By Fisher & Moser Attys

UNITED STATES PATENT OFFICE.

CHARLES LATSCH, OF CLEVELAND, OHIO, ASSIGNOR TO THE FOUILLOUX BALLON PASSOIRE COMPANY, OF CLEVELAND, OHIO.

SOUP-STRAINING APPARATUS.

No. 856,963.        Specification of Letters Patent.        Patented June 11, 1907.

Application filed October 17, 1906. Serial No. 339,357.

*To all whom it may concern:*

Be it known that I, CHARLES LATSCH, a citizen of the United States, residing at Cleveland, in the county of Cuyahoga and State of Ohio, have invented certain new and useful Improvements in Soup-Straining Apparatus; and I do declare that the following is a full, clear, and exact description of the invention, which will enable others skilled in the art to which it appertains to make and use the same.

This invention consists in a soup straining apparatus having a rotatable perforated strainer mounted in an outer containing vessel, and fixed crusher and brushing devices respectively mounted apart in said strainer and adapted to mash or crush the coarser particles in the soup and to clear the perforations from obstructions as the strainer is rotated and by its centrifugal action throws the soup out at a high speed.

Figure 1 is a vertical sectional elevation of the apparatus. Fig. 2 is a perspective view of the strainer alone and the crusher and brush folded therein to enable their joint removal with the spindle from the strainer. Fig. 3 is a plan view of the crusher and brush alone in working relation oppositely as to the spindle, which is in cross section.

A represents the containing vessel, provided with a valve controlled discharge pipe B at its bottom and having a removable cover C. Said cover inclines to the center all around from its outer edge and has a central opening with a down flange 2 and a middle socket 3 supported by arms in which shaft D is fixed against rotation.

G is the strainer, circular in cross section and larger at its top than at its bottom portions and narrowest somewhat at its immediate top where it has a flange 4 adapted to sleeve over flange 2 of the cover, which forms a top bearing for the strainer. Angular socket 5 on the bottom of the strainer is engaged by an angular end of short shaft 6, which projects through vessel A and is supported by collar 7 resting centrally on said bottom. A suitable stuffing box packs said shaft 6, and a bevel pinion 9 outside thereon is engaged by bevel gear 10 on drive shaft H, which may be hand or power driven.

Shaft D supports two wings, J and L. These are set vertically and adapted to traverse the perforated surface of the strainer. Wing J has a preferably heavy segmental leather strip 12 adapted to mash or crush large particles in the soup against the surface of the strainer. Said strip is fixed in the edge of said wing, and wing L has a brush 14 set into its edge adapted to keep the perforations or openings of the strainer clear of obstructions. Arms 15 support crushing wing J rigidly on shaft D, and arms 16 support sweeping wing L loosely thereon above arms 15.

Shaft D has a beveled point seated in the bottom of the strainer. Arms 15 have projections 17 behind shaft D which serve as stops for arms 16, whereby said wings are held oppositely when at work but may be folded as in Fig. 2 for removal with shaft or spindle D from the strainer.

Thus the strainer is rotatable while the mashing and brushing wings are fixed. This gives the strainer the important advantage of centrifugal movement to throw off the strained material instead of depending only on gravity discharge therefrom and which would not do the work. While perforated metal is shown herein as constituting the wall of the strainer I may use any equivalent open work construction for this purpose. The action of flexible leather strip 12 is of a wiping and crushing character against the larger particles which naturally accumulate about the perforations seeking to escape and where they are also thrown by the rotary action of the strainer.

The entire apparatus is separable for removal and cleaning.

What I claim is:

1. A straining apparatus comprising a containing vessel with an outlet at its bottom to carry away the strained liquid, in combination with a rotatable strainer mounted in the containing vessel having a central axis of rotation and means to rotate said strainer, whereby the contents of the vessel are discharged by the centrifugal action of the strainer, and cleansing means engaging the inner surface of the strainer adapted to keep open the perforations thereof.

2. A straining apparatus comprising a stationary outer vessel having a bottom outlet, an open work rotatable strainer in said vessel having a vertical axis and means to rotate said strainer, in combination with a stationary shaft and devices fixed thereon adapted to crush particles against the wall of the strainer and to clear the perforations of obstructions.

3. A straining apparatus comprising a fixed containing vessel having an outlet at its bottom, a rotatable strainer therein having a central vertical axis, and a shaft loosely supported in the bottom of said strainer and fixed at its top, in combination with devices on said shaft operatively engaging the inner surface of the strainer to promote the straining operation, and power connections for rotating the strainer, one of said devices having a flexible wiping portion and the other a brush to cleanse said surface.

4. In a soup straining apparatus, a fixed containing vessel having a removable cover and a valve controlled outlet at its bottom, a strainer having its lower bearing in said vessel and its upper bearing on said cover, a fixed shaft centrally in said strainer and stationary wings thereon adapted respectively to crush particles and to clear the strainer of obstructions, and means to rotate the strainer, one of said wings comprising a brush and the other a flexible wiping blade.

5. A soup straining apparatus comprising a stationary outer vessel and a cover therefor, a rotatable strainer in said vessel widest at its middle and narrowed to each end, and power connections with the bottom of said strainer, in combination with a fixed shaft supported in the bottom of the strainer and at its top in said cover, and a flexible wiper and a brush, respectively, for said strainer having arms mounted on said shaft.

6. The vessel and a removable cover thereon having a central opening and a flange about said opening and inclined toward said opening, in combination with a rotatable perforated strainer engaging said cover, means connected with the bottom of the strainer to rotate the same, a fixed shaft in the axis of said strainer, and wiping and brushing wings respectively mounted on said shaft, one of said wings rigid with said shaft and the other rotatable thereon.

7. The outer vessel adapted to hold liquid, and a removable cover thereon having a central opening and a circular downwardly extending flange about said opening, a rotatable strainer engaged with said flange and open at its upper end and closed at its bottom, a fixed shaft in said strainer separably engaged at its top in said cover, and journaled in the bottom of the strainer, and devices to crush particles and cleanse the surface of the strainer having arms locked on said shaft, in combination with means to rotate the strainer comprising a short shaft fixed in the bottom thereof from without the containing vessel and means to engage and rotate said shaft.

8. A separable soup strainer comprising an outer vessel having an outlet at its bottom and a removable cover open at its center to receive the soup, an open work strainer rotatably engaging said cover about said opening and the bottom of said vessel and power connections therefor through the bottom of said casing constructed to separably engage the strainer, in combination with a central shaft in the strainer fixed against rotation and surface contact devices for the strainer having arms engaged on said shaft, one of said devices adapted to crush particles in the soup and the other to sweep particles from the surface of the strainer.

In testimony whereof I sign this specification in the presence of two witnesses.

CHARLES LATSCH.

Witnesses:
R. B. MOSER,
R. A. KETCHAM.